Aug. 12, 1969 F. O. SALTER 3,461,237

METHOD OF ENCODING BINARY DIGITAL DATA

Filed Feb. 20, 1967 3 Sheets-Sheet 1

Inventor
Forrest O. Salter
By: Roland A. Anderson
Attorney

Inventor
Forrest O. Salter
By: Roland A. Anderson
Attorney

Aug. 12, 1969 F. O. SALTER 3,461,237

METHOD OF ENCODING BINARY DIGITAL DATA

Filed Feb. 20, 1967 3 Sheets-Sheet 3

Inventor
Forrest O. Salter
By: Roland A. Anderson
Attorney

United States Patent Office 3,461,237

Patented Aug. 12, 1969

3,461,237

METHOD OF ENCODING BINARY DIGITAL DATA

Forrest O. Salter, Glen Ellyn, Ill., assignor to the United States of America as represented by the United States Atomic Energy Commission Filed Feb. 20, 1967, Ser. No. 618,284

Int. Cl. H04l 15/04

U.S. Cl. 178—68 6 Claims

ABSTRACT OF THE DISCLOSURE

A method of encoding successive digits of a binary sequence into a sequence of two voltage levels which have one of two time durations depending upon the binary values of successive digits.

CONTRACTURAL ORIGIN OF THE INVENTION

The invention described herein was made in the course of, or under, a contract with the United States Atomic Energy Commission.

BACKGROUND OF THE INVENTION

This invention relates to electrical communication, and particularly to a method for transmission of binary digital data.

High speed transmission of binary digital data over a transmission channel having limited bandwidth requires data encoding methods which make optimum use of the available bandwith. A well-known method is return-to-zero (RZ) encoding. By this method successive digits of a binary sequence are converted into a positive and a negative voltage level of equal time duration such that each voltage level corresponds to one of the binary values of each digit. Between conversions of successive digits the voltage levels are returned to zero. Another method is nonreturn-to-zero (NRZ) encoding which is similar to the return-to-zero encoding except the two voltage levels representing the binary values are not returned to zero between successive conversions but remain at the voltage level representing the binary value of the last converted digit. NRZ encoding reduces the number of voltage alternations by a minimum of one-half as compared with the RZ encoding method and thereby may transmit data faster. Such a minimum reduction occurs when successive digits having different binary values are encoded, while the maximum reduction to no voltage alternations is achieved when successive digits having equal binary values are encoded. The NRZ sequence of voltage levels may be transmitted over a transmission channel having a frequency bandwidth $f$ if the minimum time duration of each voltage level is set to $1/2f$. Over such a transmission channel a maximum bit transfer rate of $2f$ may be obtained. The transmission time of a given number of NRZ encoded binary digits is thus limited by the frequency bandwidth of the transmission channel.

It is therefore an object of this invention to provide an improved method for encoding binary data.

It is another object of this invention to provide a method for high speed transmission of binary data.

SUMMARY OF THE INVENTION

In accordance with the invention a binary digital word is transferred from a sending device to the transmitter of a transmission system. Successive digits of the transferred digital word are encoded into a sequence of two voltage levels, each voltage level representing one of the two binary values of each digit. The time duration of each voltage level is switched between a long and a short time period such that a long time period occurs for the first digit of the digital word and for each digit preceded by a digit having a different binary value, all other digits have a short time period. The long time period is set equal to one-half of the period of the frequency bandwidth of the transmission channel. The short time period is set equal to a predetermined fraction of the long time period. The sequence of voltage levels is transmitted over a transmission channel and decoded in the receiver. The decoded digits are assembled to form the original digital word and transferred to a receiving device.

BRIEF DESCRIPTION OF THE DRAWINGS

A more complete understanding of the invention will best be obtained from consideration of the accompanying drawings in which.

The present encoding and transmitting method of a sequence of binary digits (digital word) can be regarded as one in which the transmission time of each digit is modulated by the difference of its binary value and the binary value of the immediately preceding digit.

PREFERRED EMBODIMENT OF THE INVENTION

In particular, the present method is as follows. The digital word to be transmitted is encoded, one bit at a time, starting with the least significant digit and encoded towards the most significant digit. A positive voltage level is generated for a binary one and a negative voltage level is generated for a binary zero. When no digit is encoded such as between successive digital words a zero volt level is generated. The voltage level representing the binary value of the first digit of each word and each voltage level representing the binary value of a digit which is preceded by a digit having a different binary value have a time duration preferably of one-half of the period of the frequency bandwidth of the transmission channel; the voltage level representing the binary value of a digit which is preceded by a digit having equal binary value has a time duration which is a predetermined fraction of the preferred one-half of the period of the frequency bandwidth of the transmission channel.

Figure 1:
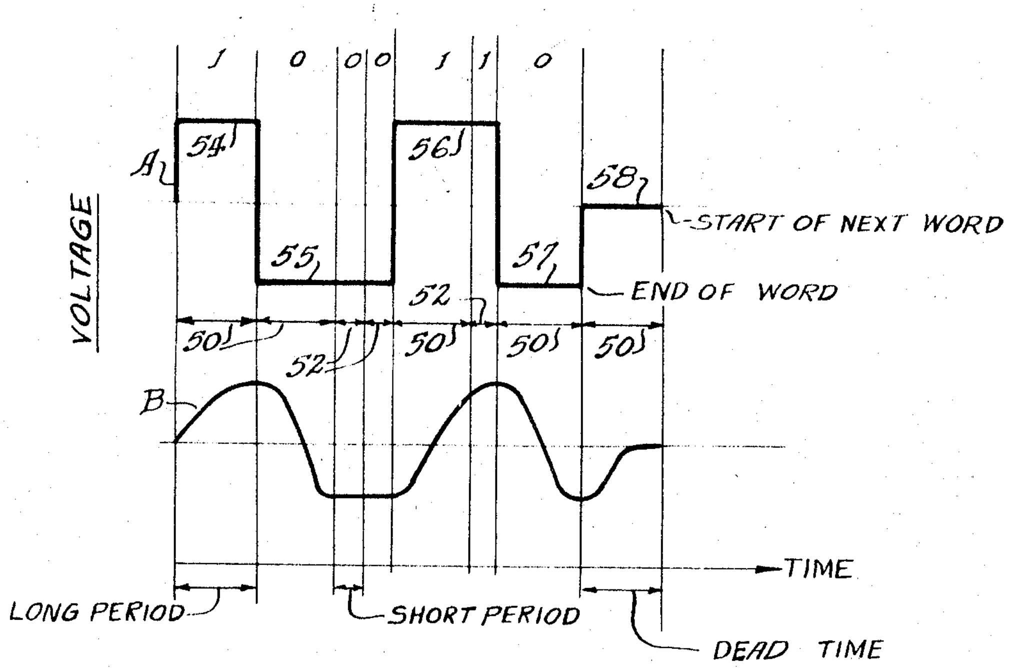
FIG. 1 consists of two curves graphically illustrating the encoding and transmission method of the invention.

Voltage wave form A in FIG. 1 illustrates the present method for a seven-digit word containing the binary code 0110001. For purposes of illustration, it is assumed that the binary word is to be transmitted over a transmission channel having a frequency bandwidth $f$. The positive voltage level 54 is generated for a time duration equal to $1/2f$ since this voltage level represents the first transmitted digit, in addition voltage level 54 is a positive voltage since the binary value of the first transmitted digit is a one. The time duration $1/2f$ is hereinafter referred to as the long time period. Since the binary value of the second digit is a zero a negative voltage level 55 which is equal in amplitude to the positive voltage level 54 is generated for a long time period 50. The binary value of the third digit is also a zero, therefore the voltage level 55 is maintained for a time duration 52 equal to a predetermined fraction of the long time period 50. This time duration 52 is hereinafter referred to as the short time period. The binary value of the fourth digit is equal to the binary value of the preceding digit, i.e., a zero, therefore the voltage level 55 is maintained for another short time duration 52. The fifth and sixth digits are both a one, therefore a positive voltage level 56 which is equal in amplitude to the voltage levels 54 and 55 is generated for a long time period 50 and a short time period 52. The seventh and last digit of the word is a zero, therefore a negative voltage level 57 which is equal in amplitude to the voltage levels 54, 55, and 56 is generated for a long time period 50. After the last digit of the word has been generated the voltage is returned to zero volt level 58 for a long time period 50. This zero volt level 58 is hereinafter referred to as the dead time 58.

Curve B of FIG. 1 represents voltage wave form A on the transmission channel having a frequency bandwidth $f$. It is to be observed that the maximum frequency component of wave form B does not exceed the frequency bandwidth $f$, yet the total transmission time of the digital word has been greatly reduced as compared to existing methods. Typically, for the practice of the present invention, a telephone transmission line having a bandwidth of 2 kc. may be used for the transmission channel. For such a transmission line, the hereinbefore described long period is preferred to be $1/2f$ or 250 microseconds and the hereinbefore described short period is preferred to be 75 microseconds.

It is to be understood that the present invention is not to be limited to the associated aforedescribed polarities or time periods, such being chosen for purposes of illustration and clarity of understanding. The method of the present invention may be equally practiced with polarities of different association and with different associated time periods.

Figure 2:
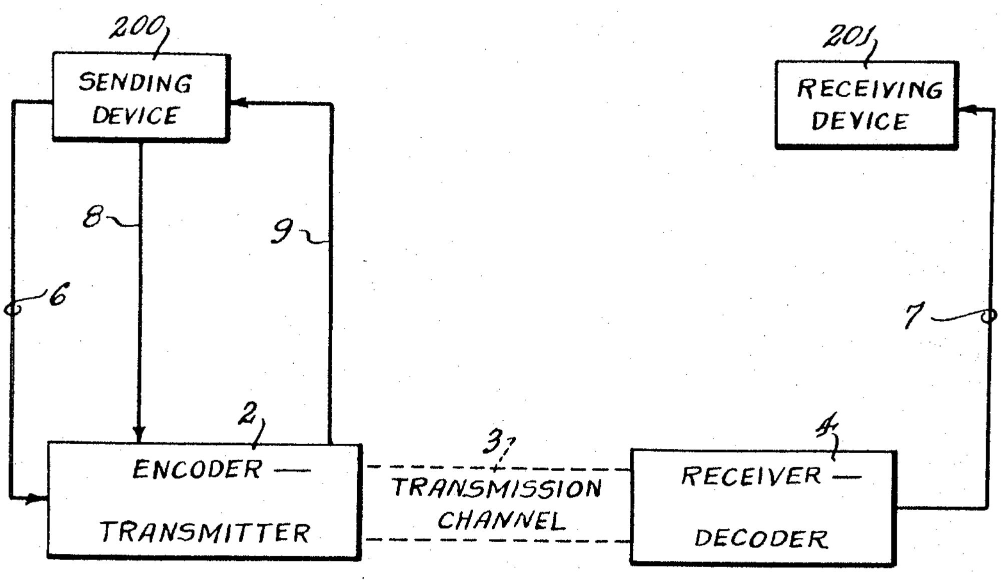
FIG. 2 illustrates by block diagram a general embodiment of an apparatus for the practice of the present invention.

A general embodiment of an apparatus for the practice of the method illustrated in FIG. 1 is shown in FIG. 2 which represents by block diagram the component parts of a transmission system.

A sending device 200, such as a digital computer, signals encoder-transmitter 2 via lead 8 when a digital word is to be transmitted to receiving device 201, such as another digital computer. The digital word is transferred via data lines 6 to encoder-transmitter 2 which transmits the digital word via transmission channel 3 to receiver-decoder 4 according to the method of the invention. After a complete digital word has been transmitted, encoder-transmitter 2 signals sending device 200 via lead 9 to transfer the next digital word.

Receiver-decoder 4 decodes and assembles the transmitted digital word. The digital word is transferred via data lines 7 to receiving device 201.

Figure 3:
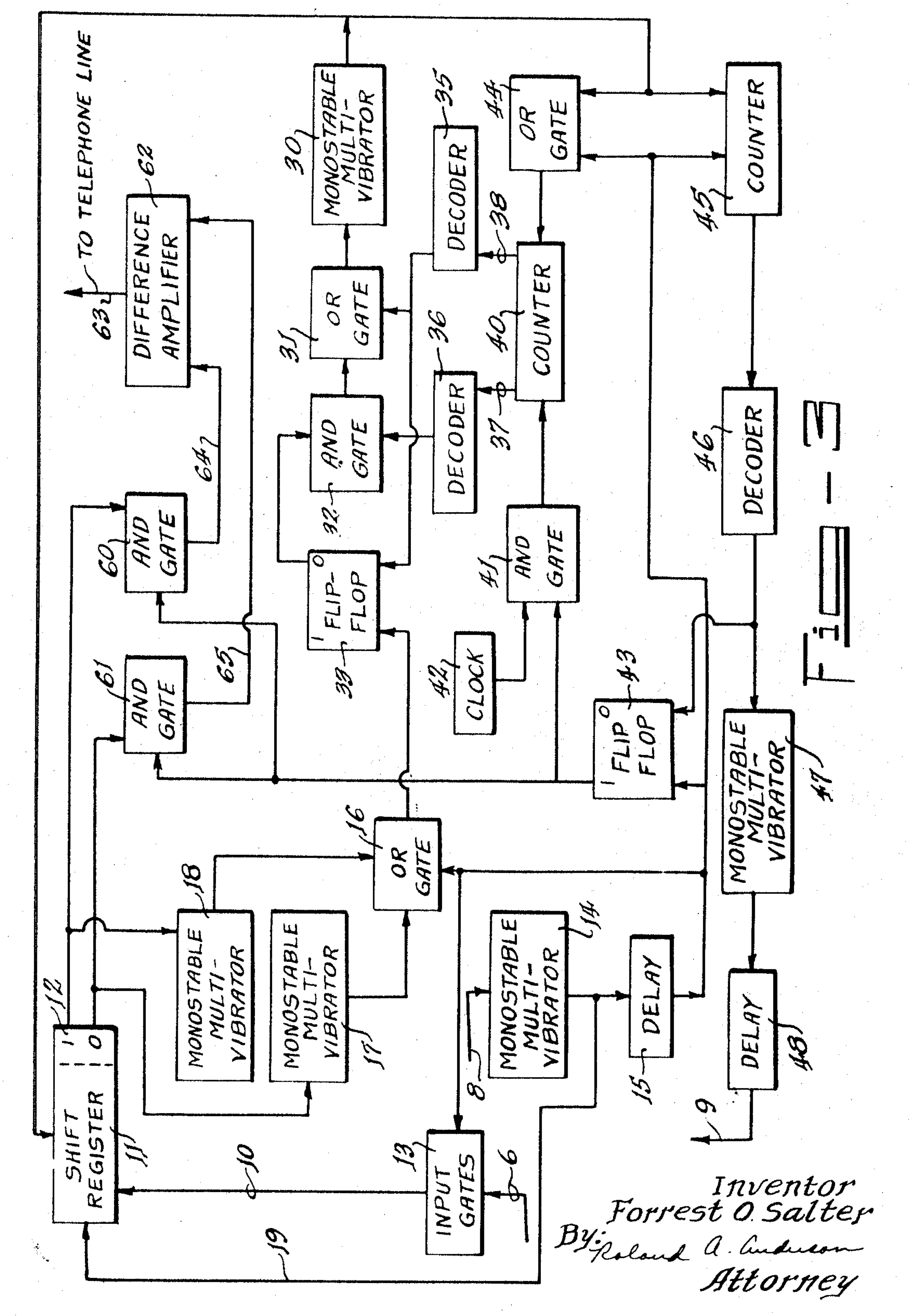
FIG. 3 is a detailed block diagram of the encoder-transmitter of the apparatus of FIG. 2.

Reference is now made to FIG. 3 for a detailed explanation of the encoder-transmitter 2 in FIG. 2 wherein a twelve-digit binary word is encoded and transmitted according to the present method over the transmission channel 3. For the purposes of the present description, a fixed positive voltage level and zero voltage level represent "true" and "false," respectively, throughout the encoder-transmitted logic circuits.

Twelve output lines 6 connect the output of the sending device 200 in FIG. 2 to twelve input gates 13. Twelve output lines 10 connect the output of each of the twelve input gates 13 to the twelve inputs of a conventional shift register 11. The shift register 11 contains twelve flip-flop stages to receive each digit of twelve digit word in the sending device 200 in FIG. 2. A monostable multivibrator 30 provides an output pulse to effect shifting of the twelve digit word contained in the shift register 11.

Sending device 200 in FIG. 2 triggers a monostable multivibrator 14 via lead 8 when a twelve digit word is to be transmitted. The output of the monostable multivibrator 14 is connected via lead 19 to the reset input of each flip-flop stage of the shift register 11, and to the input of a pulse delay 15. The monostable multivibrator 14 provides an output pulse to reset all the flip-flop stages of the shift register 11 during the delay time of the pulse delay 15. The output of the pulse delay 15 is connected to the strobe input of the twelve input gates 13, the set input of a flip-flop 43, the set input of a flip-flop 33 via an OR gate 16, the reset input of a conventional four stage flip-flop counter 45, and the reset input of a conventional eight stage flip-flop counter 40 via an OR gate 44. The output pulse of the pulse delay 15 strobes each of the twelve input gates 13 to effect the transfer of the twelve digit word from the sending device 200 in FIG. 2 to the shift register 11, sets the flip-flop 43 thereby changing its set output from "false" to "true," sets the flip-flop 33 via OR gate 16 thereby changing its reset output from "true" to "false," resets the counter 45 to the count of zero, and resets the counter 40 to the count of zero via the OR gate 44.

The set or one side of the flip-flop 43 is connected to a first input of an AND gate 60 and to a first input of an AND gate 61. The set or one output and the reset or zero output of the lowest order flip-flop stage 12 of the shift register 11 are connected to a second input of the AND gate 60 and the AND gate 61, respectively. The output 64 of the AND gate 60 and the output 65 of the AND gate 61 are presented to the inputs of a difference amplifier 62. The output 63 of the difference amplifier 62 represents the algebraic difference of the voltage levels on output lead 64 and output lead 65 such that the output 63 thereof is at a positive level when the voltage level on output lead 64 is positive and the voltage level on output lead 65 is at zero volt level, and at a negative voltage level when the voltage level on output lead 65 is positive and the voltage level on output lead 64 is at zero volt level thereby generating a positive voltage if the binary value of the digit in the lowest order stage 12 is a one and a negative voltage level if the binary value of the digit in the lowest order stage 12 is zero. The output 63 of the difference amplifier 62 is connected to the input of the receiver-decoder 4 in FIG. 2 via a telephone transmission line as hereinbefore described.

The set output of the flip-flop 43 is also connected to a first input of an AND gate 41 thereby allowing clock pulses from a conventional 400 kc. crystal controlled clock 42 to advance the counter 40 via the AND gate 41 until the flip-flop 43 is reset by an output of a conventional decoder 46 comprising a matrix of AND gates having a "true" output only when all inputs to the matrix are "true."

Decoder 35 and decoder 36 are of like type to the decoder 46 and decode a lower and a higher predetermined count in the counter 40. The lower count represents the short time period and the higher count represents the long time period in the present encoding method as hereinbefore described. Decoder 36 has a "true" output when a short time period has been generated, and the output of decoder 35 is "true" when a long time period has been generated. The time duration of the two periods may be selected by manually connecting the input leads 38 of decoder 35 and the input leads 37 of decoder 36 to different set and reset outputs of the eight flip-flop stages of the counter 40.

The reset side of the flip-flop 33 is connected to a first input of an AND gate 32. The output of the short time period decoder 36 is connected to a second input of the AND gate 32. The output of the AND gate 32 is connected to a first input of an OR gate 31. The output of the long period decoder 35 is connected to the reset input of the flip-flop 33 and to a second input of OR gate 31. The output of the OR gate 31 is connected to the input of the multivibrator 30. Since the reset output of the flip-flop 33 is "false," the AND gate 32 is disabled thereby rejecting the "true" output from the short time period decoder 36. Thus a long time period will be generated in conformance with the present encoding method in that the time duration of the first transmitted digit is a long time period. The "true" output from the long time decoder 35 resets the flip-flop 33 and passes through the OR gate 31 to trigger the monostable multivibrator 30. The output pulse from the monostable multivibrator 30 resets the counter 40 to a count of zero via the OR gate 44, and advances the counter 45 by one count.

The output pulse from the monostable multivibrator 30 also shifts each digit in the shift register 11 one place in the direction of the lowest stage 12 of the shift register 11 thereby placing the next digit to be transmitted in the lowest stage 12 of the shift register 11. The reset or zero side and the set or one side of the lowest stage 12 of the shift register 11 are connected to the input of a monostable multivibrator 17 and a monostable multivibrator 18, respectively. A difference in binary value between successive digits of the twelve digit word in the shift register 11 causes a "false" to "true" transition on either the set or reset output of the lowest order flip-flop stage 12 which triggers the corresponding monostable multivibrator of multivibrators 17 and 18. The output pulse of monostable multivibrator 17 and monostable multivibrator 18 sets the flip-flop 33 via the OR gate 16 thereby again generating a long time period in conformance with the present encoding method in that the time duration of a digit preceded by a digit having a different binary value has a long time period. In the absence of change in binary value between successive digits no transition on the set or reset outputs of the lowest order stage 12 of the shift register 11 occurs. Hence the monostable multivibrator 17 and the monostable multivibrator 18 are not triggered leaving the flip-flop 33 in the reset state thereby generating a short time period in conformance with the present encoding method in that the time duration of a digit preceded by a digit having a like binary value has a short time period.

Each time a digit is transmitted, the counter 45 is advanced one count by an output pulse from the monostable multivibrator 30. The decoder 46 decodes a count of twelve in the counter 45 which occurs when a complete twelve digit word has been transmitted. The output of the decoder 46 is connected to the reset input of the flip-flop 43 and to the input of a monostable multivibrator 47. The output of the monostable multivibrator 47 is connected to the input of a variable pulse delay 48. The time delay of the variable pulse delay 48 is set to a long time period. When the counter 45 contains the count of twelve the "false" to "true" output transition of the decoder 46 resets the flip-flop 43 thereby disabling the generation of long and short time periods, and triggers the monostable multivibrator 47. The output pulse of the monostable multivibrator 47 is delayed by the variable pulse delay 48. After a long time period delay an output pulse from the variable pulse delay signals the sending device 200 in FIG. 2 via lead 9 to transfer the next twelve digit word to the shift register 11. During the long time delay period of the variable pulse delay 48, the AND gate 60 and the AND gate 61 are disabled thereby generating a zero volt level at the output 63 of the difference amplifier 62 for a long time period duration in conformance with the present encoding method in that a zero volt level dead time is generated after each transmitted word.

Figure 4:
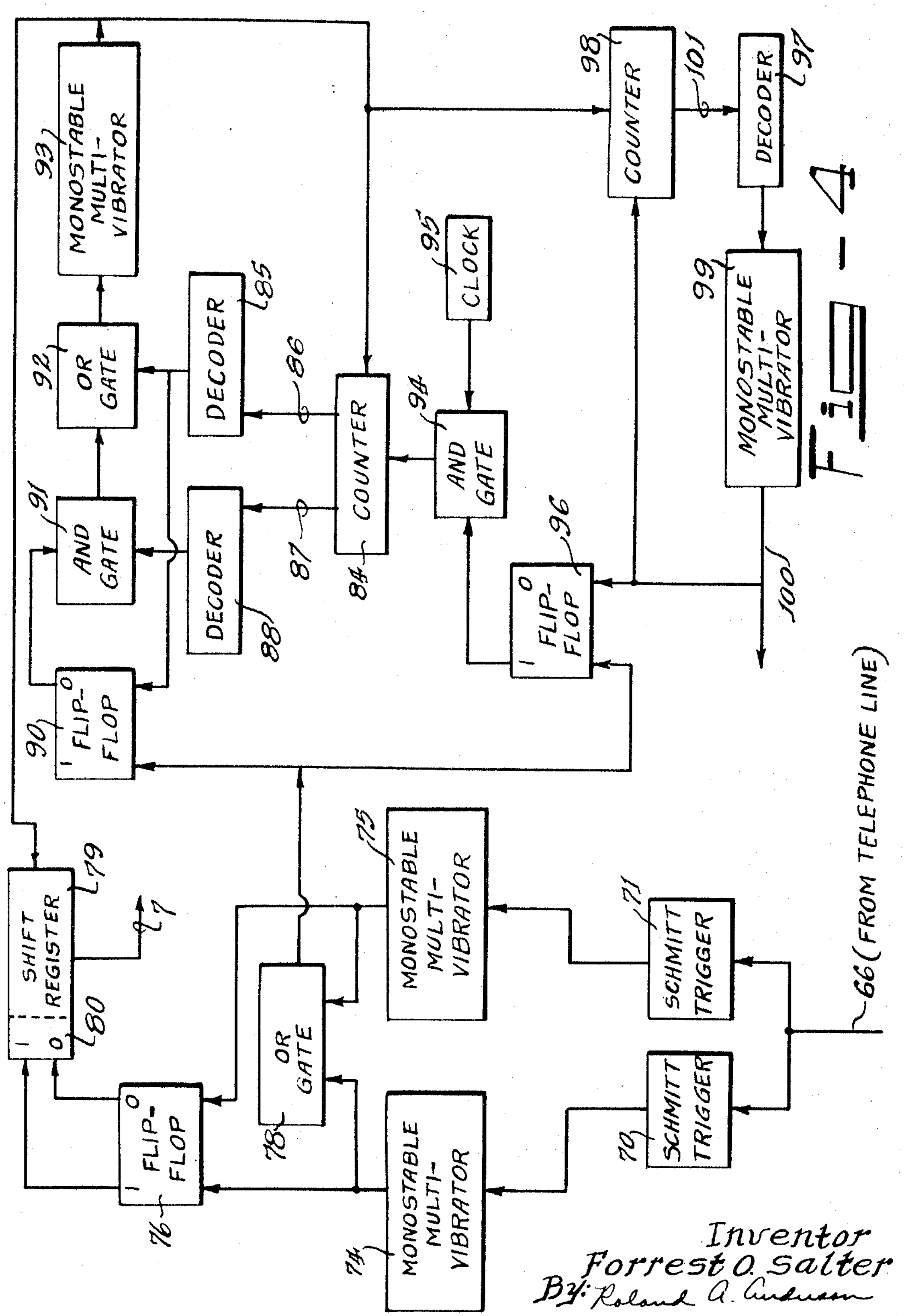
FIG. 4 is a detailed block diagram of the receiver-decoder of the apparatus of FIG. 2.

In FIG. 4 there is shown the receiver-decoder 4 in FIG. 2 for decoding the transmitted binary words. For the purposes of the present description a fixed positive voltage level and zero voltage level represent "true" and "false," respectively, throughout the receiver-decoder circuits.

The output of a Schmitt trigger 70 switches from "false" to "true" when a positive going voltage on lead 66 crosses a positive threshold level thereof and switches from "true" to "false" when a negative going voltage on lead 66 crosses the same positive threshold level. The output of Schmitt trigger 71 switches from "false" to "true" when a negative going voltage on lead 66 crosses a negative threshold level thereof and switches from "true" to "false" when a positive going voltage on lead 66 crosses the same negative threshold level. Since for the present description a one is transmitted as a positive voltage level and a zero as a negative voltage level, the Schmitt trigger 70 responds to transmitted ones and the Schmitt trigger 71 responds to transmitted zeros.

The output of the Schmitt trigger 70 and the output of the Schmitt trigger 71 are connected to the input of a monostable multivibrator 74 and a monostable multivibrator 75, respectively. The outputs of the monostable multivibrator 74 and the monostable multivibrator 75 are connected to the set and reset inputs of a flip-flop 76, respectively. A "false" to "true" transition at the output of the Schmitt trigger 70 and the Schmitt trigger 71 trigger the corresponding monostable multivibrators 74 and 75. The monostable multivibrators 74 and 75 provide an output pulse which sets and resets the flip-flop 76 thereby transferring a one or zero at the input lead 66 from the telephone transmission line 3 to the flip-flop 76.

The set and reset outputs of the flip-flop 76 are connected to the set and reset shift inputs of the highest order stage 80 of a conventional shift register 79. The shift register 79 contains twelve flip-flop stages to receive each digit of the transmitted twelve digit word. A monostable multivibrator 93 provides an output pulse to effect shifting of the contents of the shift register 79.

The outputs of the monostable multivibrators 74 and 75 are also connected via an OR gate 78 to the set input of a flip-flop 90 and the set input of a flip-flop 96. An output pulse from the monostable multivibrator 74 or from the monostable multivibrator 75 passes through the OR gate 78 and sets the flip-flop 90 thereby changing its reset output from "true" to "false," and sets the flip-flop 96 thereby changing its set output from "false" to "true."

The function and structure of the circuit comprising the flip-flop 96, AND gate 94, 400 kc. crystal controlled clock 95, eight-stage flip-flop counter 84, decoder 88, decoder 85, OR gate 92, and monostable multivibrator 93 is identical to the function and structure of the circuit in FIG. 3 comprising the flip-flop 43, AND gate 41, clock 42, counter 40, decoders 35 and 36, flip-flop 33, AND gate 32, OR gate 31, and monostable multivibrator 30. In addition the input leads 87 and 86 to decoders 88 and 85 respectively, are connected to the appropriate set and reset outputs of the flip-flop stages of the counter 84 as in the circuit of FIGURE 3 such that the long and short time periods generated in the transmitter-encoder in FIG. 3 are equal to the long and short time periods decoded by the decoders 88 and 85.

When a long or short time period has been decoded an output pulse from the monostable multivibrator 93 shifts the contents of the shift register 79 one place in the direction of its lowest order stage and transfers the existing state of the flip-flop 76 to the highest order flip-flop stage 80 of the shift register 79. Twelve shift pulses from monostable multivibrator 93 are thus required to place a twelve-digit word in the shift register 79.

Each output pulse from the monostable multivibrator 93 also advances a conventional four-stage flip-flop counter 98, a decoder 97, similar to decoders 85 and 88, has a "true" output when the counter 98 contains the count of twelve which occurs when a complete twelve-digit word has been received from the transmitter-encoder 2 in FIG. 2. The "true" output of the decoder 97 triggers a monostable multivibrator 99. An output lead 100 from monostable multivibrator 99 is connected to the reset input of the flip-flop 96, the reset input of the counter 98, and the receiving device 201 in FIG. 2. An output pulse from the monostable multivibrator 99 thus resets the flip-flop 96 thereby disabling the generation of long and short time periods, resets the counter 98 to a count of zero, and signals the receiving device 201 in FIG. 2 that a complete twelve digit word is ready in the shift register 79 for transfer via twelve output lines 7.

In operation, if the first digit of the transmitted word is a one, Schmitt trigger 70 is triggered by the positive going voltage, representing a one, on lead 66. The "false"-to-"true" output transition of Schmitt trigger 70 triggers monostable multivibrator 74. The output pulse of monostable multivibrator 74 sets flip-flop 76, and passes through OR gate 78 to set flip-flop 90 and flip-flop 96. The set output of flip-flop 96 allows clock pulses from clock 95 to advance counter 84 via AND gate 94. A long time period of 250 microseconds will be generated since the "true" output of short time period decoder 88 is rejected by disabled AND gate 91. The "true" output of long time period decoder 85 resets the flip-flop 90 and triggers the monostable multivibrator 93. The output of the monostable multivibrators 93 resets all flip-flops in counter 84, advances counter 98 by one count, shifts the contents of shift register 79 by one place, and transfers the binary value of flip-flop 76, a "one" at this time, to the highest order flip-flop stage 80 of the shift register 79. If the second digit of the transmitted word is also a one then the Schmitt trigger output remains at "true" since the voltage on lead 66 remains at a positive level in conformance with the present encoding method. Neither monostable multivibrator 74 nor monostable multivibrator 75 will be triggered. Therefore flip-flop 76 remains set. A short time period will be generated since flip-flop 90 is reset. An output pulse from monostable multivibrator 93 shifts the contents of shift register one place and transfers the binary value of flip-flop 76, a "one," to the highest order flip-flop stage 80 of shift register 79. If the third digit of the transmitted word is a zero, Schmitt trigger 71 is triggered by the negative going voltage, representing a zero on input lead 66 from telephone transmission line 3. The "false"-to-"true" output of Schmitt trigger 71 resets flip-flop 76 via monostable multivibrator 75. A long time period is generated after which the zero state of flip-flop 76 is transferred to highest order stage 80 of shift register 79. Successive digits are thus decoded and assembled in the proper order in shift register 79. When a complete word has been received, counter 98 contains the count of twelve and the output of decoder 97 switched from "false" to "true" triggering monostable multivibrator 99. The output pulse 100 of monostable multivibrator 99 resets the flip-flops in counter 98, resets flip-flop 96 and signals receiving device 201 in FIG. 2 to receive the completed word.

Persons skilled in the art will, of course, readily adapt the general teachings of the invention to methods other than the specific methods illustrated. Accordingly the scope of the protection afforded the invention should not be limited to the particular method shown in the drawings and described above, but shall be determined only in accordance with the appended claims.

The embodiments of the invention in which an exclusive property or privilege is claimed are defined as follows.

I claim:

1. A method of encoding a sequence of binary digits having first and second values, comprising generating for each of said digits having a first value and preceded by a digit having a second value a first voltage level having a predetermined time duration, generating for each of said digits having a second value and preceded by a digit having a first value a second voltage level having a time duration equal to that of said first voltage level, generating for each of said digits having a first value and preceded by a digit having a first value a third voltage level equal in amplitude to said first voltage level but different in time duration therefrom, and generating for each of said digits having a second value and preceded by a digit having a second value a fourth voltage level equal in amplitude to said second voltage level but having a time duration equal to said third voltage level.

2. The method of encoding a sequence of binary digits according to claim 1 in which said first and third voltage levels are of like polarity and said second and fourth voltage levels are of like polarity but opposite in polarity to said first and third voltage levels,

3. The method of encoding a sequence of binary digits according to claim 1 including generating a zero voltage level having a predetermined time duration after the termination of said sequence of binary digits.

4. A method of transmitting a sequence of binary digits having first and second values over a transmission channel having a predetermined frequency bandwidth comprising transmitting for each of said digits having a first value and preceded by a digit having a second value a first voltage level for a duration equal to one-half of the period of said frequency bandwith, transmitting for each of said digits having a second value and preceded by a digit having a first value a second voltage level for a duration equal to one-half of the period of said frequency bandwidth, transmitting for each digit having a first value and preceded by a digit having a like value said first voltage level for a duration equal to a predetermined fraction of one-half of the period of said frequency bandwidth, transmitting for each digit having a second value and preceded by a digit having a like value said second voltage level for a duration equal to a predetermined fraction of one-half of the period of said frequency bandwidth, and decoding said transmitted voltage levels into corresponding binary digits.

5. The method of transmitting binary digits according to claim 4 in which said first and second voltage levels have equal amplitudes but opposite polarities.

6. The method of transmitting binary digits according to claim 5 including transmitting after termination of said sequence of binary digits a zero voltage level having a predetermined time duration.

No references cited.

ROBERT L. GRIFFIN, Primary Examiner

R. S. BELL, Assistant Examiner

U.S. Cl. X.R.

325—141; 340—347, 349